Figure 1:
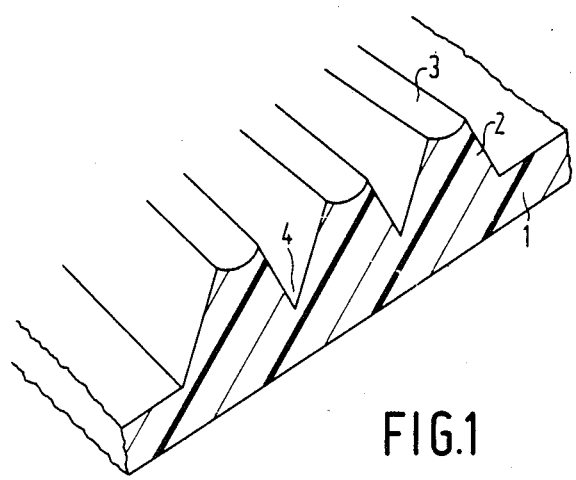

United States Patent [19]
van der Staak et al.

[11] Patent Number: 4,688,093
[45] Date of Patent: Aug. 18, 1987

[54] TRANSMISSION PROJECTION SCREEN AND METHOD OF MANUFACTURING SAME

[75] Inventors: Caspert G. I. van der Staak; Johannes C. van de Ven, both of Eindhoven, Netherlands

[73] Assignee: U.S. Philips Corporation, New York, N.Y.

[21] Appl. No.: 891,983

[22] Filed: Jul. 30, 1986

[30] Foreign Application Priority Data

Apr. 15, 1986 [NL] Netherlands .......................... 8600944

[51] Int. Cl.⁴ ............................................. G03B 21/60
[52] U.S. Cl. ..................................... 350/128; 350/126
[58] Field of Search ................................ 350/126–129

[56] References Cited

U.S. PATENT DOCUMENTS 4,468,092  8/1984  Inoue et al. .......................... 350/128
4,525,029  6/1985  Inoue et al. .......................... 350/128
4,573,764  3/1986  Bradley .............................. 350/128

Primary Examiner—Richard A. Wintercorn
Attorney, Agent, or Firm—Thomas A. Briody; William J. Streeter; Marianne R. Rich

[57] ABSTRACT

The invention relates to a transmission projection screen having a high light output and a suitable contrast, for example for use in a projection television system, and a method of manufacturing such a screen.

The projection screen comprises a transparent substrate having a front surface which is provided with mutually parallel ribs 2. At the bottom of the grooves 4 between the ribs 2 two individual layers of light-absorbing particles 11 and 12 are provided. The said particles are fixed by means of an adhesive layer 14.

6 Claims, 5 Drawing Figures

TRANSMISSION PROJECTION SCREEN AND METHOD OF MANUFACTURING SAME

The invention relates to a transmission projection screen comprising a transparent substrate having a front surface which is provided with mutually parallel ribs from which light issues during operation of the screen, grooves being present between the successive ribs, in which grooves an amount of light-absorbing particles is disposed whose average size is at least 20% of the width of the grooves measured halfway the depth of these grooves.

The invention also relates to a method of manufacturing a transmission projection screen.

Such a screen is used, for example, for displaying images or alphanumeric data which are projected on the rear surface of the screen, for example, by a lens systems with one or more cathode-ray tubes or by a film projector. The transparent ribs located at the front surface focus the light rays which are received from the rear side and which issue via the apexes of the ribs. The grooves between the ribs remain dark. In order to avoid reflection of ambient light from both the front side and the rear side of the screen, which would reduce the contrast of the image to be displayed, a light-absorbing material is disposed in the grooves.

Netherlands Patent Application No. NL 8600042 describes a transmission projection screen and a method of manufacturing such a screen, in which method discrete black particles are deposited and fixed in the grooves. The black particles consist of, for example, soot or a ferritic material and have a dimension of maximally 75% of the width of the grooves measured halfway the depth of these grooves. These steps were taken to provide a transmission projection screen in which there is only a very slight optical contact between the light-absorbing material and the substrate with the ribs, thereby leaving the light output of the screen substantially unaffected while improving the contrast.

It is an object of the invention to provide a transmission projection screen whose diffuse reflection of ambient light is less than 6.5%, thereby further improving the image contrast.

This object is achieved in accordance with the invention by a transmission projection screen as described in the opening paragraph, which screen is further characterized in that the light-absorbing particles located in the grooves are divided into two layers, the first layer comprising particles having dimensions from 20 to 50% and the second layer comprising particles having dimensions from 75 to 125% of the width of the grooves measured halfway the depth of these grooves.

In order to obtain a screen having a substantially reduced reflection, it is efficient for the particles in the first layer to be in contact with the particles in the second layer, for example, via an adhesive layer. This reduced reflection is obtained because the layers act as blinds.

Unlike the projection screen described in Netherlands Patent Application No. NL 8600042, the light absorbing particles, particularly the second layer, are not entirely situated in the bottom half of the grooves. Although this leads to a reduction of the light output, the presence of two light-absorbing layers reduces the reflection to such an extent that a substantial improvement in image contrast is obtained.

Due to the relatively large dimension of the particles, few particles are needed to obtain the desired light absorption. Because of the small number of particles there are only few contact areas between the particles and the walls of the ribs. The maximum particle size is dictated by the wish that the particles should penetrate the grooves as far as possible in order not to absorb the light issuing from the apexes of the ribs. Limiting the size of the particles is also desired in order to homogeneously fill the grooves in a longitudinal direction so as to obtain a screen having a smooth appearance. On the other hand, by using large particles it is precluded that any light-absorbing particles remain on the apexes of the ribs, for example at the location of a possible lens structure.

A further object of the invention is to provide a method of manufacturing a transmission projection screen having light-absorbing particles in the grooves, in which also relatively large light-absorbing particles can readily be deposited in the grooves. An additional object of the invention is to provide a method by means of which any type of light-absorbing particles can be deposited, even if they are not provided with a synthetic-resin layer.

This object is achieved in accordance with the invention by a method which comprises the following steps:

- a substrate having mutually parallel ribs is coated with an excess of light-absorbing particles having dimensions of from 20 to 50% of the width of the grooves measured halfway the depth of the grooves,
- a brush is moved over the screen in the longitudinal direction of the grooves, so that the light-absorbing particles are pressed to the bottom of the grooves and the excess particles are removed from the screen,
- an excess of light-absorbing particles is provided onto the screen, which particles have dimensions of from 75 to 125% of the width of the grooves measured halfway the depth of the grooves,
- a brush is moved over the screen in the longitudinal direction of the grooves, so that the light-absorbing particles are pressed to the bottom of the grooves and the excess particles are removed from the screen,
- the screen is coated with an amount of an adhesive which suffices to fill the grooves, which adhesive has a low solids content,
- whilst drying the adhesive, connections are formed between the light-absorbing particles and the walls of the grooves and amongst the particles themselves.

The light-absorbing layers must penetrate the grooves as far as possible, for that reason they are separately applied and pressed with a brush, after which the adhesive is applied.

An advantage of this method is that after drying the adhesive layer does not have to be sticky, consequently the screen obtained is hardly sensitive to contamination, for example, by dust.

The choice of the adhesive is dictated by the materials used for both the substrate with the ribs, and the light-absorbing particles.

In order to obtain that after drying the adhesive layer does not fill the grooves and does not adversely affect the shape of the ribs, the solids content of the adhesive layer to be applied is, preferably, from 0.5 to 20% by weight. Thus, the internal reflection of the light in the ribs remains optimal.

A requirement which must be met by the light-absorbing particles is that they do not resolve into smaller particles when they are subjected to common mechanical treatments such as brushing, because this would nullify the desired effect of the invention. Suitable light-absorbing materials are, for example, soot, ferrite particles, black synthetic-resin particles, black glass beads and short pieces of black glass fibre. The particles may have any shape, provided that the number of contact areas between the particles and the walls of the grooves does not increase. Preferably, particles having curved surfaces are used, for example convex particles, because in general they establish only point-like contacts with the substrate and the ribs. The particles may consist of smaller particles provided that they are strongly bonded, for example by sintering.

The invention will now be further explained by means of an example of an embodiment and with reference to a drawing, in which FIG. 1 is a perspective sectional view of a substrate having mutually parallel ribs, and in which FIG. 2a-d schematically represents a number of steps of the method in accordance with the invention.

EXEMPLARY EMBODIMENT

FIG. 1 shows a substrate 1, for example a polymethylmethacrylate, provided with ribs 2. The screen shown in the figure is flat, but the invention may also be applied to a slightly curved screen. The ribs 2 are provided at the front surface with a lens structure 3. However, dependent upon the desired optical characteristic of the screen the apexes of the ribs may have various shapes. Between the ribs 2 there are mainly V-shaped grooves 4. The grooves may also have, for example, a flat bottom. The ribs and the grooves may be formed on the surface of the substrate by means of, for example, a replica technique which is known per se, for example by means of a curable synthetic-resin composition, for example one that can be cured by UV light. In accordance with an atlernative method, the ribs and grooves can also be formed in a substrate by means of hot pressing. The rear surface of the substrate (not shown in the figure) may also be provided with an optical element, for example a fresnel structure.

In accordance with the present exemplary embodiment, the pitch between the mutually parallel grooves, i.e. the distance measured between the deepest points of two successive grooves is 289 μm, the depth of the grooves 4 is 430 μm, the width of the grooves measured halfway the depth of the grooves is 110 μm.

An excess of convex black ferrite particles 11 having dimensions from 25 to 50 μm is disposed along one of the edges of the screen. The black particles are longitudinally brushed into the grooves by means of a nylon brush having bristles of 100 μm, see FIG. 2a.

The bristles of the nylon brush used all have the same dimensions which are selected so that the bristles can press the black particles deep into the grooves. Because of the desired reproducibility of the method, preferably, a rotating brush is used whose pressure on the screen can be accurately adjusted, and along which the screen is moved by mechanical means.

Subsequently, an excess of convex black ferrite particles 12 having dimensions from 100 to 125 μm is disposed along one of the edges of the screen. The black particles are longitudinally brushed into the grooves by means of a nylon brush having bristles of 400 μm, see FIG. 2b.

Next, a 2.5% by weight solution of a polymethylmethacrylate in, for example, ethylacetate/isopropanol (volume ratio of the mixture 1:1) is applied to the surface. By capillary action the grooves 4 are filled with the adhesive 13, see FIG. 2c. If necessary, the excess adhesive is removed by means of an absorbing, non-fluff cloth.

Figure 2A:
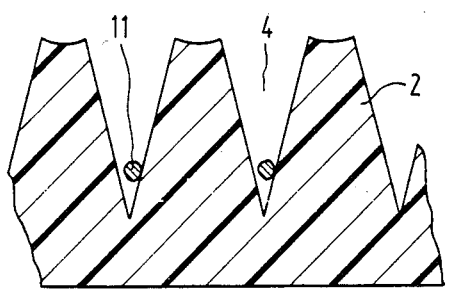
Figure 2B:
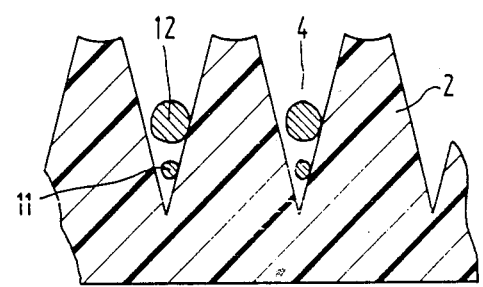
Figure 2C:
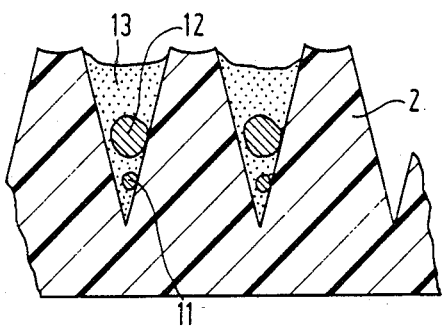
Figure 2D:
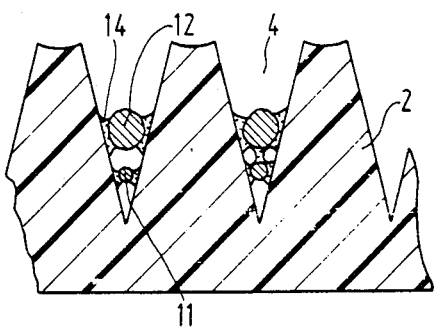

FIG. 2d is a sectional view of the result obtained after evaporation of the solvent (for example, at 50° C. for 15 minutes). The polymethylmethacrylate adhesive layer 14 is situated almost exclusively at the location of the glued particles 11 and 12. The adhesive layer 14 does not stick after the adhesive has dried.

The diffuse reflection measured at the projection screen thus manufactured is from 4 to 4.5%. For the sake of comparison it is to be noted that the diffuse reflection at a screen which, apart from the fact that it only has one layer of light-absorbing particles having dimensions from 50 to 80 μm, is identical to the above-mentioned one, amounts to 8 to 9% and that the diffuse reflection of a screen without a light-absorbing layer amounts to more than 15%.

The light output of the screen in accordance with the exemplary embodiment is from 53 to 54%. A screen having a single light-absorbing layer has a light output from 57 to 58%. These measurements were carried out on screens having a somewhat rough surface; screens having a smooth surface may, however, have a light output of more than 60% independent of the fact whether they have 1 or 2 light-absorbing layers.

The projection screens manufactured in accordance with the above-described exemplary embodiment have a high light output and a very good contrast, and they are sufficiently resistant to the action of mechanical influences, moisture and cleaning agents.

What is claimed is:

1. A transmission projection screen comprising a transparent substrate having a front surface which is provided with mutually parallel ribs from which light issues during operation of the screen, grooves being present between the successive ribs, in which grooves an amount of light-absorbing particles is disposed whose average size is at least 20% of the width of the grooves measured halfway the depth of these grooves, characterized in that the light-absorbing particles in the grooves are divided into two layers, the first layer comprising particles having dimensions from 20 to 50% and the second layer comprising particles having dimensions from 75 to 125% of the width of the grooves measured halfway the depth of these grooves.

2. A transmission projection screen as claimed in claim 1, characterized in that the particles in the first layer are in contact with the particles in the second layer.

3. A method of manufacturing a transmission projection screen as claimed in claim 1, characterized in that the method comprises the following steps:
    a substrate having mutually parallel ribs is provided with an excess of light-absorbing particles whose dimensions are from 20 to 50% of the width measured halfway the depth of the grooves,
    a brush is moved over the screen in the longitudinal direction of the grooves, so that the light-absorbing particles are pressed to the bottom of the grooves and the excess particles are removed from the screen, an excess of light-absorbing particles is provided onto the screen, which particles have dimensions from 75 to 125% of the width of the grooves measured halfway the depth of the grooves, a brush is moved over the screen in the longitudinal direction of the grooves, so that the light-absorbing particles are pressed to the bottom of the grooves and the excess particles are removed from the screen, the screen is coated with an amount of an adhesive which suffices to fill the grooves, which adhesive has a low solids content, whilst drying the adhesive, connections are formed between the light-absorbing particles and the walls of the grooves and amongst the particles themselves.

4. A method as claimed in claim 3, characterized in that prior to drying the solids content of the adhesive is from 0.5 to 20% by weight.

5. A method of manufacturing a transmission projection screen as claimed in claim 2, characterized in that the method comprises the following steps:

a substrate having mutually parallel ribs is provided with an excess of light-absorbing particles whose dimensions are from 20 to 50% of the width measured halfway the depth of the grooves, a brush is moved over the screen in the longitudinal direction of the grooves, so that the light-absorbing particles are pressed to the bottom of the grooves and the excess particles are removed from the screen, an excess of light-absorbing particles is provided onto the screen, which particles have dimensions from 75 to 125% of the width of the grooves measured halfway the depth of the grooves, a brush is moved over the screen in the longitudinal direction of the grooves, so that the light-absorbing particles are pressed to the bottom of the grooves and the excess particles are removed from the screen, the screen is coated with an amount of an adhesive which suffices to fill the grooves, which adhesive has a low solids content, whilst drying the adhesive, connections are formed between the light-absorbing particles and the walls of the grooves and amongst the particles themselves.

6. A method as claimed in claim 5, characterized in that prior to drying the solids content of the adhesive is from 0.5 to 20% by weight.

* * * * *